United States Patent
Hikichi

(10) Patent No.: US 7,647,488 B2
(45) Date of Patent: Jan. 12, 2010

(54) INFORMATION PROCESSING DEVICE WITH BRANCH HISTORY RESTORATION

(75) Inventor: Toru Hikichi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 11/071,306

(22) Filed: Mar. 4, 2005

(65) Prior Publication Data
US 2005/0149710 A1 Jul. 7, 2005

Related U.S. Application Data

(63) Continuation of application No. PCT/JP03/00901, filed on Jan. 30, 2003.

(51) Int. Cl.
*G06F 9/00* (2006.01)
(52) U.S. Cl. ............ 712/240; 712/239; 712/236
(58) Field of Classification Search .......... 712/233–240
See application file for complete search history.

(56) References Cited

U.S. PATENT DOCUMENTS

| | | | | |
|---|---|---|---|---|
| 5,655,115 | A * | 8/1997 | Shen et al. | 712/239 |
| 5,887,152 | A * | 3/1999 | Tran | 712/217 |
| 5,915,110 | A * | 6/1999 | Witt et al. | 712/239 |
| 6,256,729 | B1 * | 7/2001 | Cherabuddi et al. | 712/238 |
| 6,519,730 | B1 * | 2/2003 | Ando et al. | 714/746 |
| 6,560,696 | B1 * | 5/2003 | Hummel et al. | 712/237 |
| 6,928,537 | B2 * | 8/2005 | Henry et al. | 712/240 |
| 2001/0020267 | A1 | 9/2001 | Koino | |
| 2002/0066006 | A1 * | 5/2002 | Worrell | 712/237 |
| 2002/0087852 | A1 * | 7/2002 | Jourdan et al. | 712/240 |
| 2003/0120906 | A1 * | 6/2003 | Jourdan et al. | 712/242 |

FOREIGN PATENT DOCUMENTS

| | | |
|---|---|---|
| JP | 6-301534 | 10/1994 |
| JP | 2003-005956 | 1/2003 |

OTHER PUBLICATIONS

K. Skadron et al., "Speculative Updates of Local and Global Branch History: A Quantitative Analysis", Journal of Instruction-level Parallelism, vol. 2, (http://www.jilp.org/vol2).
S. Jourdan et al., "Recover Requirements of Branch Prediction Storage Structures in the Presence of Mispredicted-Path Execution", International Journal of Parallel Programming, vol. 25, No. 5, pp. 363-383.

* cited by examiner

*Primary Examiner*—Eddie P Chan
*Assistant Examiner*—Idriss N Alrobaye
(74) *Attorney, Agent, or Firm*—Staas & Halsey LLP

(57) ABSTRACT

The information processing device of the present invention stores the branch history information of a fetched instruction. When branch prediction fails, BHR information used for the branch prediction is restored using this stored branch history information. Thus, even when branch prediction fails, BHR information can be accurately restored. Accordingly, prediction accuracy can be improved.

17 Claims, 14 Drawing Sheets

INFORMATION PROCESSING DEVICE WITH BRANCH HISTORY RESTORATION

CROSS-REFERENCE TO RELATED APPLICATION

This application is a continuation of an International Application No. PCT/JP2003/000901, which was filed on Jan. 30, 2003.

BACKGROUND OF THE INVENTION

1. Field of the Invention

The present invention relates to an information processing device for performing a pipeline process, and more particularly to a technology for pipeline control in branch prediction.

2. Description of the Related Art

In an information processing device which is represented by a microprocessor whose high integration and high clock advance with the progress of a semiconductor technology, recently a pipeline technology for dividing a process when executing one instruction into a plurality of stages and operating the process mechanism of each stage independently and in parallel has been used in order to improve the execution speed of an instruction. In many of the information processing devices, a method provided with a plurality of such pipelines called "super scalar" is adopted and instructions are speculatively executed by a plurality of pipelines.

When performing a pipeline process, several instructions are simultaneously executed like an assembly-line operation. Therefore, if an instruction is branched in another part of memory by a branch instruction, subsequent instructions whose processes are already started must be all discarded and process efficiency degrades. In order to prevent this, branch prediction is conducted in the information processing device. In branch prediction, it is predicted whether a branch instruction branches. If it is likely to branch, a branch destination instruction is inputted to a pipeline.

For such a branch prediction method, a method for recording branch histories in advance and predicting whether an instruction branches, based on this history is used.

In this method, branch intensity is determined referring to a storage area on which is recorded branch prediction information, based on a branch history called a "branch history table (BHT)" and branch prediction is conducted. In this case, a method for using the combination of values (hereinafter called "BHR information") in an address at the time of instruction fetch (hereinafter called "FPC") and a global history register (hereinafter called a "branch history register (BHR)") is popular as a tag for retrieving data from a BHT.

FIG. 1 explains branch prediction by a method using a branch history.

In FIG. 1, a BHT1 is a table for recording a tag, which is not shown in FIG. 1, based on fetched addresses and BHR information, and two-bit branch prediction information based on whether branch is conducted in the branch information of an address corresponding to the tag. A BHR2 is a plural-bit of register (in FIG. 1, five-bit) for recording what branch prediction is conducted in a plurality of branch instruction executed close at hand (in FIG. 2, five).

When conducting branch prediction, in the information processing device, a tag is generated from a fetched program counter value (FPC) and BHR information in the BHR2 at that time. The BHT1 is retrieved using this tag, and branch prediction is conducted based on branch prediction information read from the BHT1.

The BHT1 stores one of strongly not-taken, weakly not-taken, strongly taken and weakly taken as branch prediction information. Then, if the branch prediction information read from the BHT1 is either "strongly not-taken" or "weakly not-taken", it is predicted to be "not-taken", and if it is either "strongly taken" or "weakly taken", it is predicted to be "taken". The branch prediction information in the BHT1 continues to be successively updated based on whether branch is actually conducted. In the following description, if a branch instruction is branched or predicted to be branched, it is called "taken", and if the branch instruction is not branched or predicted not to be branched, it is called "not-taken".

When the result of the branch prediction is obtained, in the BHR2, the contents are shifted to the left by one bit, and the prediction result is set in the right-most bit. For example, branch (taken) is predicted, '1' is set, and if non-branch (not-taken) is predicted, '0' is set. In the following description, if '1' is set in the right-most bit of BHR and shifted, it is called "1-shift", and if 0 is set and shifted, it is called "0-shift".

If branch prediction fails when a branch prediction method for advancing a process while predicting whether a branch instruction is branched when fetching an instruction is applied to a pipeline, a stage not related to the current process occurs in each slot of the pipeline, that is, a pipeline bubble occurs and performance greatly degrades.

Since in branch prediction, performance penalty due to failed prediction is heavy, in order to improve performance, prediction accuracy must be improved. In order to improve prediction accuracy, it is also important how to restore a state before branch prediction when failing in branch prediction.

For a branch prediction technology, a variety of proposals have been made, which includes a method disclosed by Japanese Patent Application No. H6-301534 (Information Processing Device).

Japanese Patent Application No. H6-301534 discloses a configuration with two execution pipelines of one for executing instructions before a branch instruction and the other for executing instructions after a branch instruction ahead. When failing in branch prediction, a state can be restored by switching pipelines.

As one using a branch history, Japanese Patent Application No. 2001-243069 (Branch Prediction Device and Method) discloses a method for bypassing the state transition of branch prediction to the branch prediction state of the same branch instruction on a pipeline in order to cope with the fact that the state transition of branch prediction information diverts from an actual branch operation.

In the method using a branch history, conventionally in the information processing device with a shallow pipeline structure, one cycle covers until a subsequent fetch is conducted after the BHT1 is retrieved and branch prediction is conducted. Therefore, the update control of FPC and BHR information was easy. However, recently it has become popular to improve performance by the use of an operation clock with a high frequency, and in order to improve performance, a control configuration with a deep pipeline has been used. Therefore, in such an information processing device, branch prediction is conducted across several cycles when fetching an instruction.

In the case of a deep pipeline, in the information processing device for conducting branch prediction by retrieving data from the BHT2 using an instruction fetch address (FPC) and a value in the BHR1, sometimes branch prediction is conducted a specific number of cycles later after starting an instruction fetch. In this case, when branch prediction fails, it is necessary to re-fetch after restoring the branch instruction to a state immediately after the failed branch prediction. For that purpose, information about a branch instruction must be stored in a branch instruction reservation station in advance, and when the failed branch prediction is determined, the branch instruction must be returned to the state where the fetch is conducted and re-fetched using the information stored in the reservation station.

In this case, BHR information must also be restored to the value used when fetching a branch instruction whose update control is not performed in each pipeline. However, if a pipeline is deep and fetch covers several cycles, as the BHR information, the pipeline states at the time of fetch cannot be all restored, and as the reproduction process of the BHR information, the BHR information is restored using the BHR information in the case where the branch prediction has failed is used without nay modifications.

However, in this case, since the BHR information in the case where fetching a branch instruction cannot be accurately restored, prediction accuracy degrades, which is a problem.

SUMMARY OF THE INVENTION

The information processing device of the present invention presumes one requiring a plurality of cycles to control branch prediction, and comprises a branch history information storage unit and a BHR reconstruction unit.

The branch history information storage unit stores the branch history information of fetched instructions.

When the branch prediction of the branch instruction fails, the BHR reconstruction unit restores the BHR information used for branch prediction, using the branch history information stored in the branch history information storage unit.

Thus, even if branch prediction fails, BHR information can be accurately restored. Accordingly, prediction accuracy can be improved.

By making branch history information contain information based on BHR information for the plurality of cycles, such as BHR information used to predict the branch of the fetched instruction and difference information between the BHR information and other BHR information, accurate branch prediction control can also be realized by a simple configuration and simple control.

DESCRIPTION OF THE PREFERRED EMBODIMENTS

Figure 2:
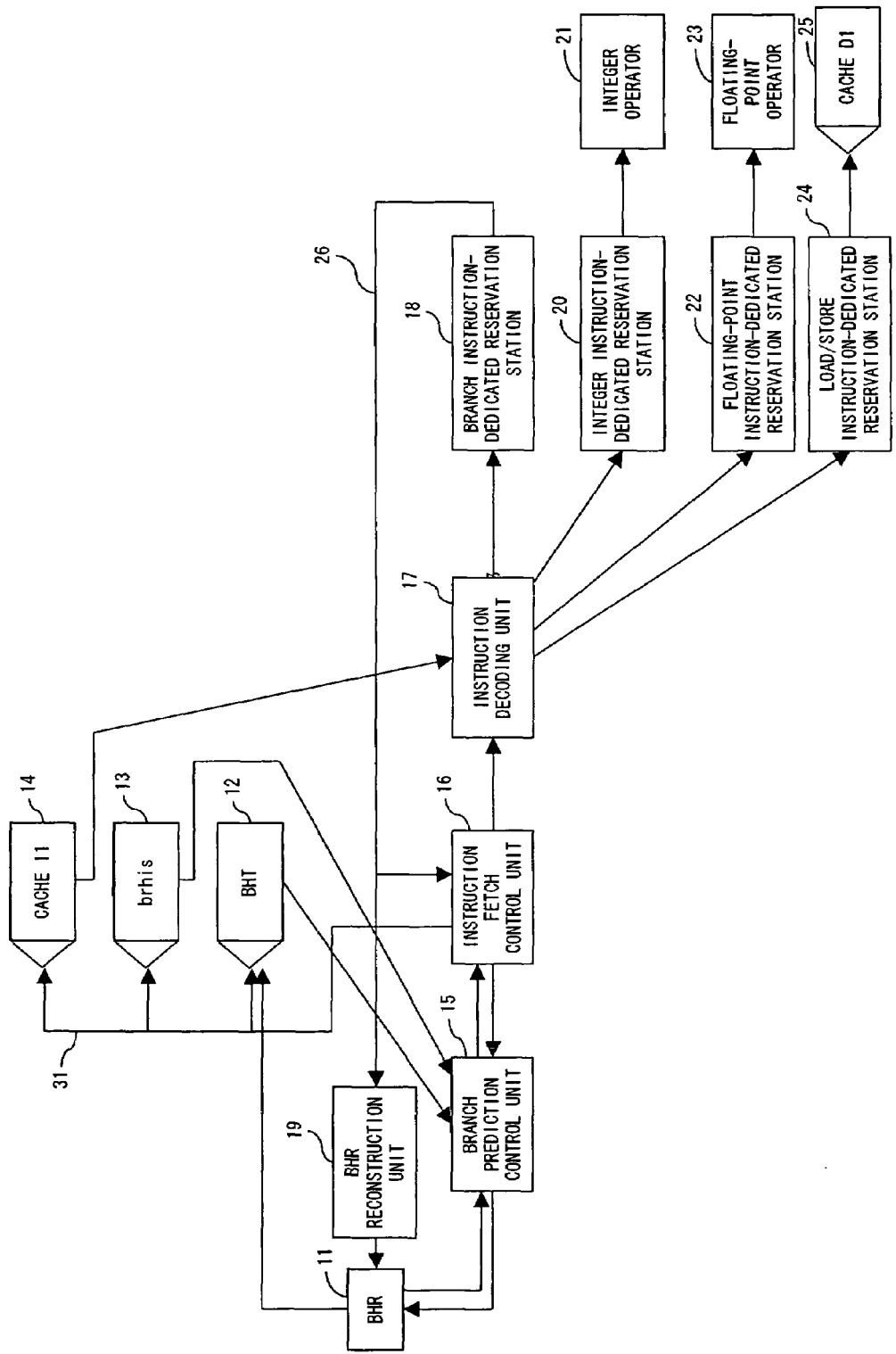
FIG. 2 is a block diagram showing the configuration of a part related to the branch prediction of the information processing device in the preferred embodiment.

FIG. 2 is a block diagram showing the configuration of a part related to the branch prediction of the information processing device in the preferred embodiment.

In FIG. 2, the information processing device in the preferred embodiment comprises a BHR 11, a BHT 12, a branch history (brhis) 13, primary instruction cache 14, a branch prediction control unit 15, an instruction decoding unit 17, a branch instruction-dedicated reservation station 18, a BHR reconstruction unit 19, an integer-dedicated reservation station 20, a floating point operation-dedicated reservation station 21, a LOAD/STORE instruction-dedicated reservation station 22, an integer operator 23, a floating point operator 24 and primary data cache 25.

The BHR 11 is a ten-bit global history register. If a plurality of branch instructions executed close at hand (in this preferred embodiment, ten) is "taken", the BHR 11 stores branch histories recorded as '1', and if the branch history is "not-taken", the BHR 11 stores branch histories recorded as '0'. In the information processing device in this preferred embodiment, this BHR 11 stores a plurality of segments of BHR information.

The BHT 12 is a table for recording a tag, which is not shown in FIG. 2, generated from a fetched address or the like and two-bit branch prediction information based on whether branch is actually conducted at an address corresponding to the tag. In this preferred embodiment, the BHT 12 has a configuration of two bits×16 k address. The brhis 13 is a table with information about branch instructions previously not executed, and records information, such as whether the instruction code of a referenced address is a branch instruction, the target address, what attribute the branch instruction has, in the case of a branch instruction, and the like. The brhis 13 stores a tag generated from the address. When a tag generated from a fetched address is compared with a tag stored in the brhis 13 (tag match), it is hit and information is read from the brhis 13, the branch prediction control unit 15 determines that the fetch instruction code is a branch instruction. The primary instruction cache 14 is primary instruction cache memory, and the instruction decoding unit 17 reads an instruction code to decode from this primary instruction cache 14.

The branch prediction control unit 15 takes charge of a branch prediction process. The branch prediction control unit 15 checks whether an instruction referenced by an FPC, based on the result of the tag match with the brhis 13 by the FPC, and also predicts whether the branch instruction is "taken" or "not-taken", based on the FPC and branch prediction information read from the BHT 12 according to BHR information stored in the BHR 11 at that time. Based on the result of the branch prediction, the BHR information in the BHR 11 is also updated.

An instruction fetch control unit 16 generates a fetch address, based on the branch prediction result by the branch prediction control unit 15 or the like. Using this fetch address, the BHT 12, brhis 13 and primary instruction cache 14 are referenced. The instruction decoding unit 17 reads a fetched instruction code from the primary instruction cache 14, decodes it and distributes the fetched instruction to one of the integer instruction-dedicated reservation station 20, floating point operation-dedicated reservation station 21 and LOAD/STORE instruction-dedicated reservation station 22, based on the result. The branch instruction-dedicated reservation station 18 monitors a condition code register indicating a variety of states which become the branch conditions of a conditional branch instruction and determines whether the result of branch prediction conducted by the branch prediction control unit 15 fails. If the branch prediction fails, the branch instruction-dedicated reservation station 18 notifies the instruction fetch control unit 16 and BHR reconstruction unit 19 of the failure through a reproduction path 26 and also transmits branch history information to the instruction fetch control unit 16 and BHR reconstruction unit 19 to restore the BHR information.

Upon receipt of the prediction failure notice from the branch instruction-dedicated reservation station 18, the BHR reconstruction unit 19 restores the BHR information to the state in the case where the failed branch instruction is fetched based on the branch history information. The operation of this BHR reconstruction unit 19 is described in detail later.

The integer instruction-dedicated reservation station 20 and floating point operation-dedicated reservation station 21 are reservation stations for an integer operation instruction and a floating point operation instruction, respectively. The integer instruction-dedicated reservation station 20 and floating point operation-dedicated reservation station 21 store instructions distributed by the instruction decoding unit 17, and transmit them to the integer operator 23 and floating point operator 24, respectively, after changing their order or the like. The LOAD/STORE instruction-dedicated reservation station 22 is a reservation station for LOAD/STORE instructions to memory, and accesses the primary data cache 25, based on an instruction inputted by the instruction decoding unit 17.

The integer operator 23 executes integer operation instructions, and the floating point operator 24 executes floating point operation instructions. The primary data cache 25 is primary data cache memory, and the LOAD/STORE instruction-dedicated reservation station 22 accesses this primary data cache 25 for a LOAD/STORE instruction.

The instruction code read from the primary instruction cache 14 is decoded by the instruction decoding unit 17, based on an address indicated by the instruction fetch control unit 16 at the time of fetch. The branch prediction control unit 15 also refers to the BHT 12 and brhis 13, using BHR information stored in the BHR 11 at that time and a FPC and conducts branch prediction. The BHR information used the branch prediction is transferred to the instruction decoding unit 17 and branch instruction-dedicated reservation station 18 in that order together with its difference information and the like as the stage of a pipeline advances. Then, if in the branch instruction-dedicated reservation station 18, it is determined that the branch prediction fails and re-fetch is conducted, the branch instruction-dedicated reservation station 18 transmits corresponding branch history information to the BHR reconstruction unit 19. Then, the BHR reconstruction unit 19 restores the BHR information to the state where the branch of this branch instruction is accurately predicted, based on this branch history information.

FIG. 3 shows the reproduction principle of BHR information at the time of failed prediction, of the information processing device in the preferred embodiment.

Figure 3A:
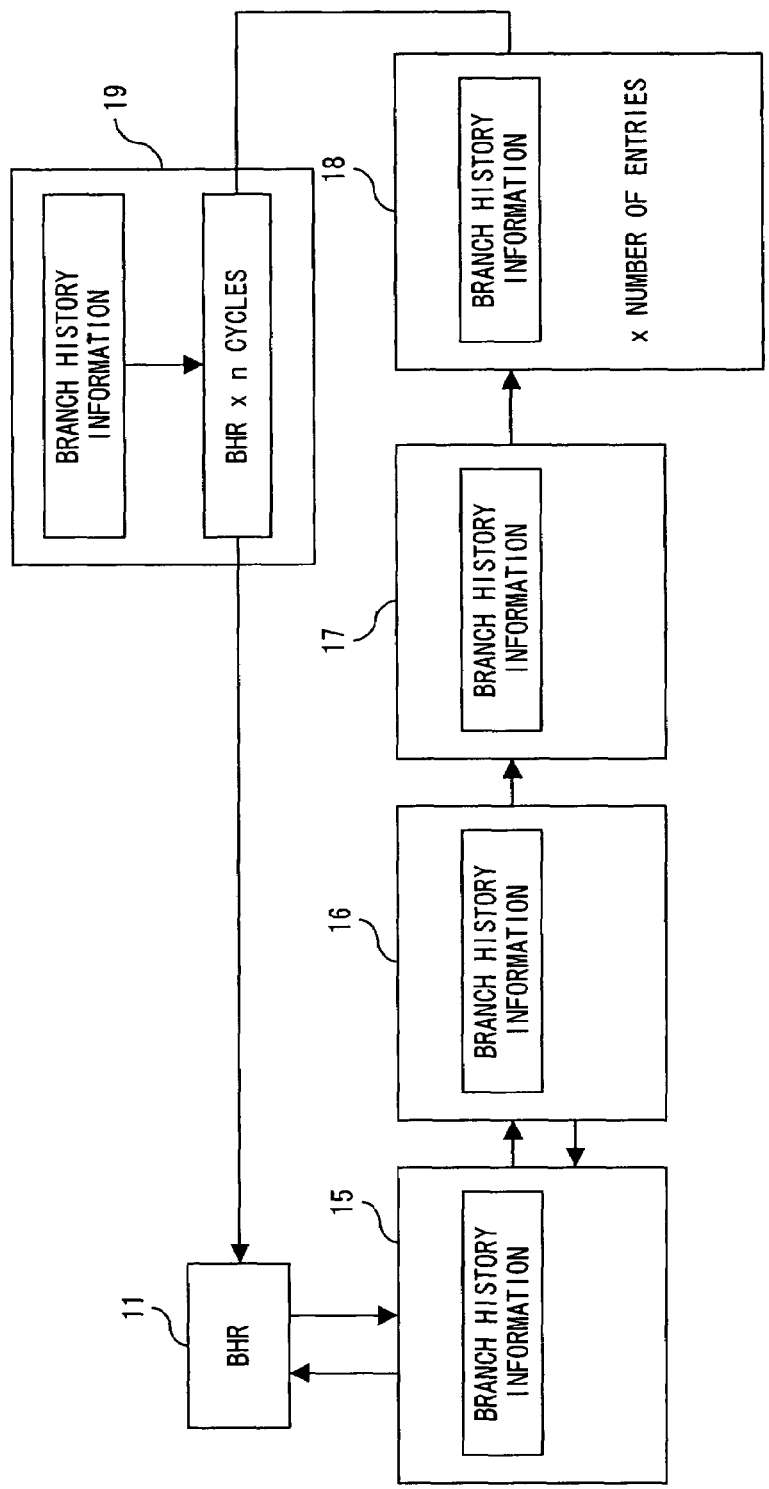
FIG. 3 shows the reproduction principle of BHR information at the time of failed prediction, of the information processing device in the preferred embodiment.

In the information processing device in this preferred embodiment, as shown in FIG. 3A, branch history information indicating BHR information in the case where the instruction of a pipeline is fetched for each pipeline is transferred from the branch prediction control unit 15 to the instruction fetch control unit 16, the instruction decoding unit 17 and the branch instruction-dedicated reservation station 18 in that order. The branch instruction-dedicated reservation station 18 stores the branch history information of a plurality of instructions, and if the branch instruction-dedicated reservation station 18 determines that the branch prediction of a branch instruction fails, the branch history information of the branch instruction is transmitted to the BHR reconstruction unit 19 together with a branch prediction failure notice. Then, the BHR reconstruction unit 19 restores BHR information for n cycles, based on this branch history information and returns it to the BHR 11. When re-fetching, branch prediction is conducted based on this restored BHR information. In this case, this value n is determined based on the structure of a pipeline, the number of stages required for instruction fetch and the like.

As branch history information, a variety of things can be considered. For example, after fetching an instruction code, all BHR information for n cycles can be possessed as branch history information. Alternatively, both BHR information fetched as shown in FIG. 3B and the difference information between this BHR information and BHR information for n subsequent cycles can be possessed as branch history information.

Figure 3B:
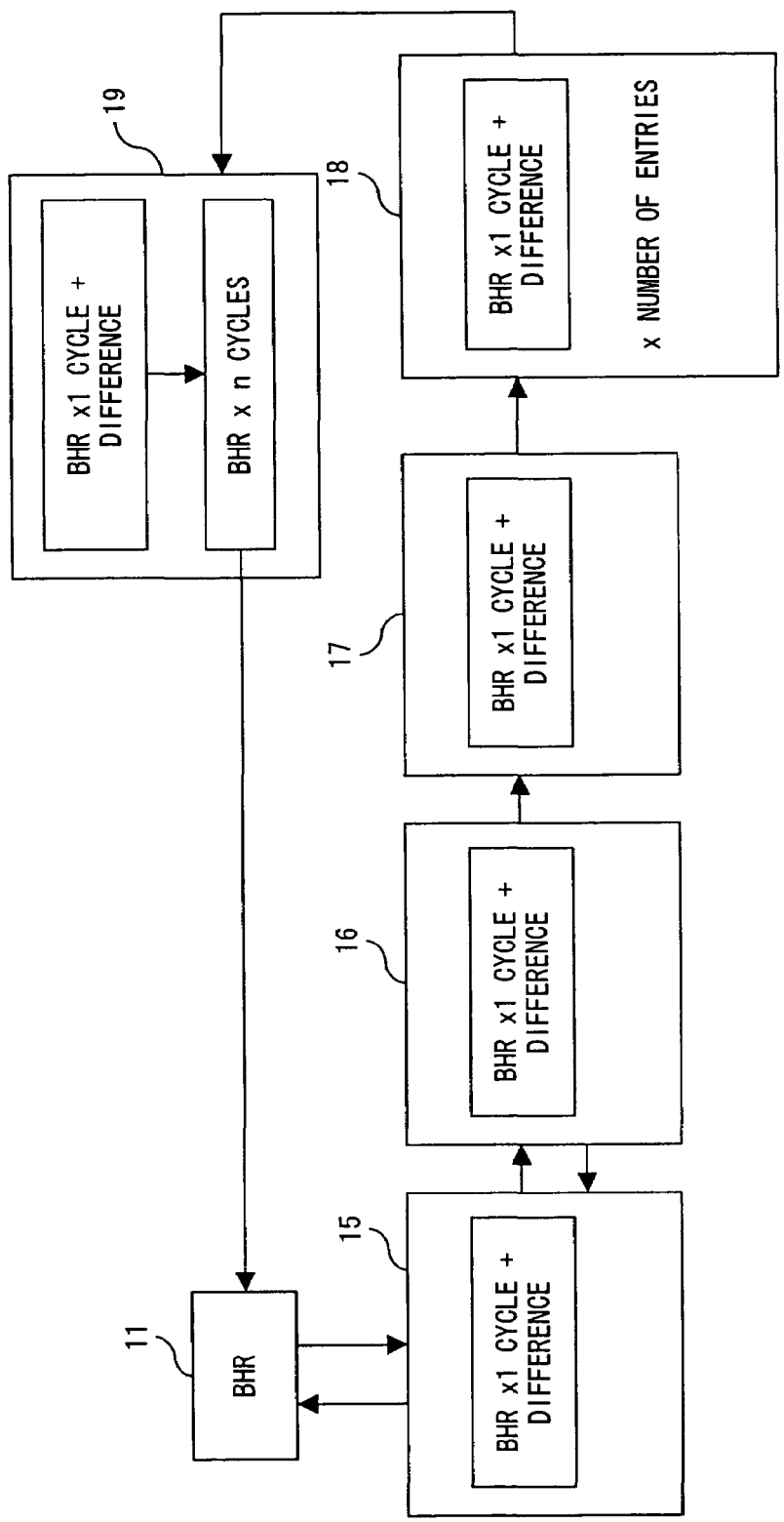

Since in the case of a configuration with the difference information as shown in FIG. 3B, hardware resources can be saved, in the following description, this configuration is used.

The information processing device in this preferred embodiment is assumed to be provided with a pipeline structure with the following three stages in the instruction fetch part.

At a stage A, the BHT 12, brhis 13 and primary instruction cache 14 are retrieved.

At a stage T, the brhis 13 and BHT 12 are read.

At a stage U, the tag match of the brhis 13 is performed, and branch prediction by the BHT 12 is conducted based on the tag match information.

As described above, in the pipeline of this preferred embodiment, at stage A, the BHT 12 is referenced using BHT information, and at stage U after three cycles, the result of branch prediction is determined. Therefore, the BHR 11 is configured to store BHR information for three cycles (BHR0, BHR1 and BHR2) and their difference information.

Although a variety of things can be considered as the update conditions of BHR information, in this example, the BHR information is updated on the following conditions.
(1) Predicted to be "taken" in a conditional branch instruction→1-shift
(2) Predicted to be "not-taken" in a conditional branch instruction→0-shift
(3) No branch instruction (no hit in the brhis 13)→No shift
(4) Predicted to be "taken" in a non-conditional branch instruction and no conditional branch instruction in the previous slot→No shift (as to a slot, described later)

(5) Predicted to be "taken" in a non-conditional branch instruction and a conditional branch instruction in the previous slot→0-shift Since the dependence relationship in BHR information between pipelines is complex, the BHR 11 stores BHR information for three cycles (BHR0, BHR1 and BHR2), and updates and uses the BHR information used when fetching is toured, like BHR0→BHR1→BHR2→BHR0. BHR information to be used is pointed by a pointer, and this pointer is incremented every fetch.

The BHR 11 has the following three segments of difference information, BHR0_RESTORE, BHR1_RESTORE and BHR2_RESTORE for the three segments of BHR information, and the three segments of difference information are also updated when the BHR information is updated.

BHR0_RESTORE [1:0]: BHR2 [9:0]→Difference information of BHR0[9:0]
BHR1_RESTORE [1:0]: BHR0[9:0]→Difference information of BHR1 [9:0]
BHR2_RESTORE [1:0]: BHR1 [9:0]→Difference information of BHR2 [9:0]

Each segment of difference information is two-bit information and has the following meanings.

'11': 1-shift
'01': 0-shift
'x0': No shift (x: arbitrary)

For example, if BHR0_RESTORE is '11', BHR0 can be obtained by shifting and setting BHR2 to '1'.

Firstly, the update operation of BHR information in the case where branch prediction succeeds is described.

In the case of the pipeline structure of this preferred embodiment, since it takes two cycles until the result of branch prediction is determined after the BHT 12 is referenced using BHR information, the BHT 12 is retrieved using BHR information in two cycles before the result of the branch prediction is determined. Then, if the result of the branch prediction is "taken", a two-cycle bubble occurs when starting fetching a subsequent branch destination address. If the result of the branch prediction is "not-taken", only BHR information referenced when fetching is updated, and at the time of branch and re-fetch, all segments of BHR information are simultaneously updated.

Figure 4:
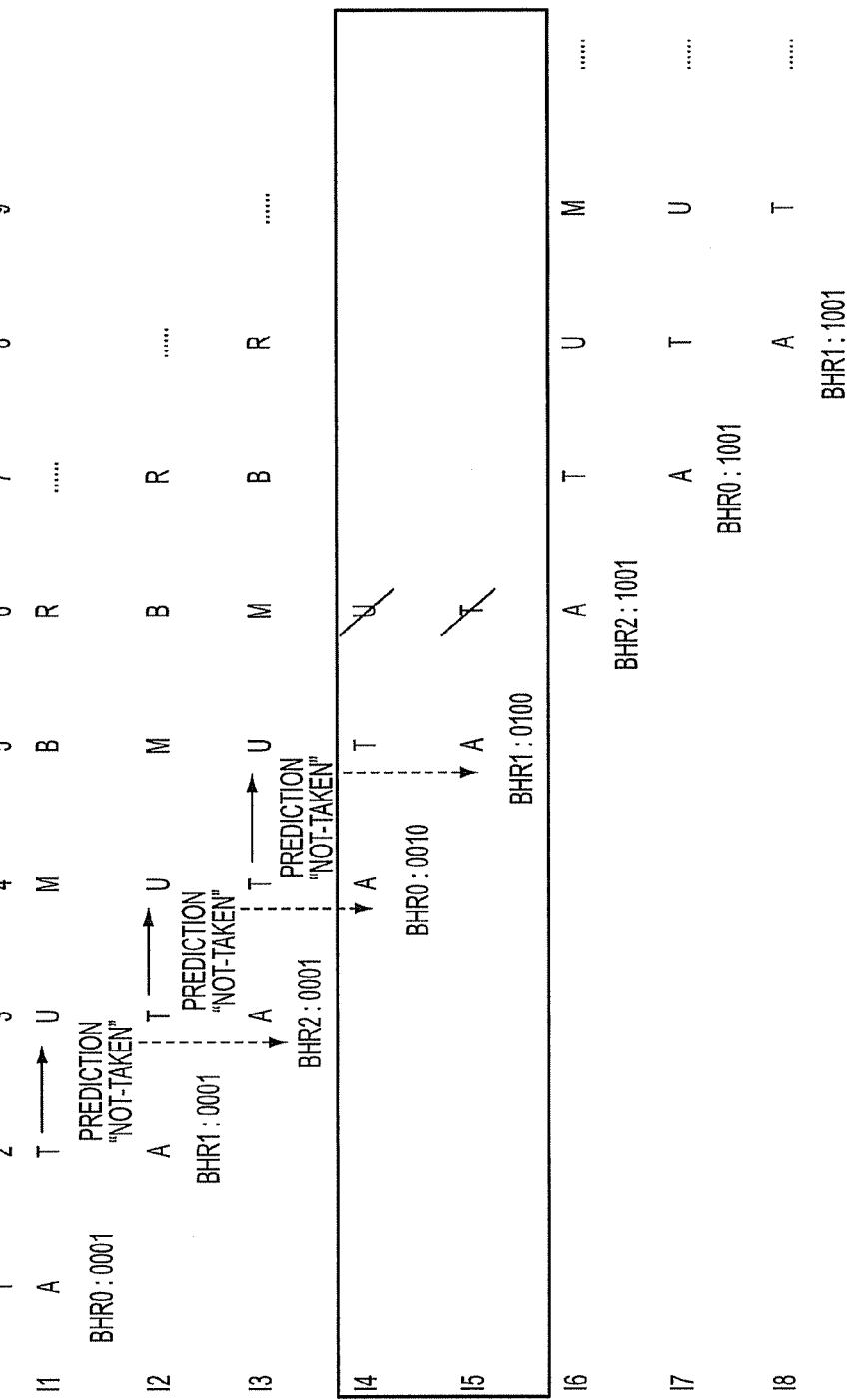
FIG. 4 shows an example of the change of BHR information in the information processing device of the preferred embodiment in the case where branch prediction all succeeds.

FIG. 4 shows an example of the change of BHR information in the information processing device of the preferred embodiment in the case where branch prediction all succeeds. In FIG. 4, instructions, it is assumed that I1, I2 and I3 are branch instructions and their branch prediction results are "not-taken", "not-taken" and "taken", respectively. It is assumed that three instructions, which are not shown in FIG. 4, fetched before the instruction I1 are not branch instructions, and that BHR information is not updated by these instructions.

In FIG. 4, it is assumed that firstly, in cycle 1, the instruction I1 is fetched, and this branch instruction I1 is predicted to be "not-taken" in cycle 3, as a result of the reference to the BHT 12 by the value 0001 of the BHR0. During this period, the branch instructions I2 and I3 are fetched in cycles 2 and 3, respectively, and also the BHT 12 is referenced using the value 0001 of the BHR1 and the value 0001 of the BHR2, respectively.

If the result of the branch prediction is "not-taken", prediction is continued without any modifications after the prediction results of the instructions I1 and I2 are determined since there is no need for re-fetch. However, if the result of the branch prediction is "taken", since a branch destination instruction must be fetched, re-fetch is conducted, instructions after that are nullified and a pipeline bubble occurs. In FIG. 4, the branch prediction result of the instruction I3 is determined to be "taken" in cycle 4, and subsequent instructions I4 and I5 become bubbles.

Then, instructions I6, I7 and I8 are fetched in that order, according to the branch destination of the branch instruction I3. However, in this case, BHR information for the instructions I6, I7 and I8 are obtained by shifting and setting the prediction result ("taken") of the instructions I3 to '1', based on the BHR information (BHR1: 0001) for the instruction I3.

Since in the information processing of this preferred embodiment, a cycle using BHR information and a cycle determining a branch prediction result are different, the BHR information can be accurately restored even if the result of the branch prediction is "taken".

Next, the operation in the case where branch prediction fails is described.

The BHR information used when fetching is transmitted from the instruction fetch control unit 16 to the branch instruction-dedicated reservation station 18 through the instruction decoding unit 17 together with other information needed when re-fetching difference information or the like.

By determining the state of a condition code register referenced by a branch instruction, it is determined whether the branch instruction is actually branched. The branch instruction-dedicated reservation station 18 determines whether a branch direction by branch prediction and an actual branch direction are matched, based on the state of the condition code register. If they are not matched, the branch instruction-dedicated reservation station 18 transmits a re-fetch starting address, branch history information and the like to the instruction fetch control unit 16 together with a re-fetch request. Of these segments of information, the branch history information is used to restore BHR information at the time of fetch.

Figure 5:
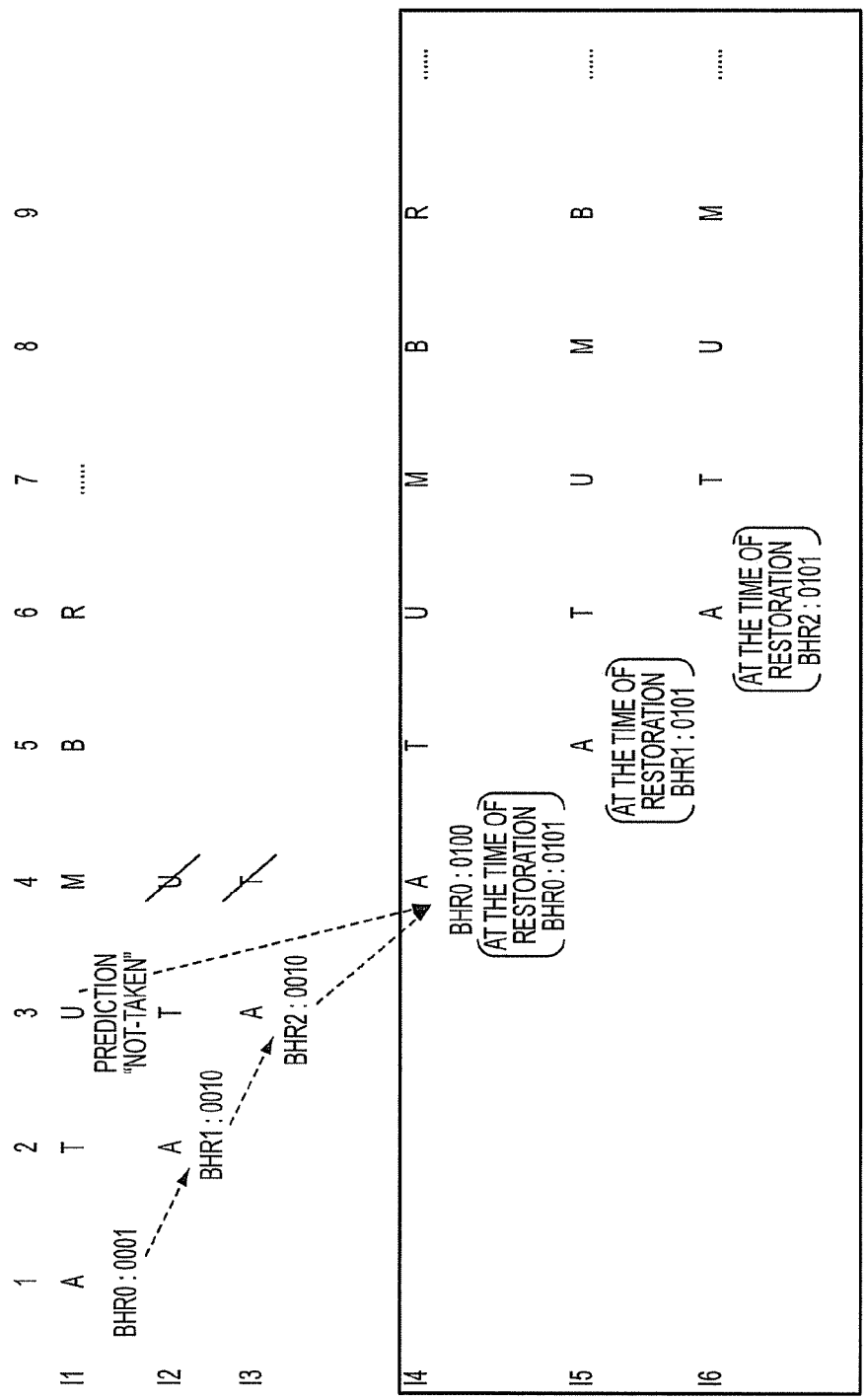
FIG. 5 shows an example of the change of BHR information in the information processing device of the preferred embodiment in the case where a branch instruction is actually "taken" although it is predicted to be "not-taken".

FIG. 5 shows an example of the change of BHR information in the information processing device of the preferred embodiment in the case where a branch instruction is actually "taken" although it is predicted to be "not-taken".

In FIG. 5, it is assumed that although the instruction I1 is predicted to be "not-taken", it is actually "taken" judging from the state of a condition code register.

The branch prediction of the instruction I1 fetched at the stage A of cycle 1 is conducted before the stage U of cycle 3. In this example, since it is predicted to be "not-taken", the instructions I2 and I3 continues to be processed without being discarded.

When the branch conditions of the instruction I1 are determined and it is detected that branch prediction fails, from the state of the condition code register, the branch instruction-dedicated reservation station 18 notifies the instruction fetch control unit 16 and BHR reconstruction unit 19 of the branch prediction failure. The BHR reconstruction unit 19 restores BHR information according to which the instruction I1 is predicted to be "taken", according to branch history information, and generates BHR information to be used to fetch branch destination instructions I4, I5 and I6.

The BHR information of the instruction I4 restores BHR information (BHR1: 0001) used in the instruction I2, using BHR information (BHR0: 0001) used in the instruction I1 and difference information and restores BHR information (BHR2: 0010) used in the instruction I3, using this BHR information used in the instruction I2 and difference information. To this BHR information used in the instruction I3, 1-shift is applied as if the instruction I1 were predicted to be "taken", and BHR information to be used in the instructions I4, I5 and I6 is generated. In FIG. 5, BHR1: 0010 is restored by applying difference information P_REIFCH_BHR_RESTORE1=BHR1_RESTORE=01 to the BHR information (BHR0: 0001) used in the instruction I1, and by applying difference information P_REIFCH_BHR_RESTORE2=BHR2_RESTORE=00 to this, BHR2: 0010 is restored. Then, 1-shift is applied to this BHR2: 0010, and BHR information BHR0: 0101, BHR1: 0101, BHR2: 0101 is generated. The P_REIFCH_BHR_RESTORE1 and P_REIFCH_BHR_RESTORE2 are described later.

Next, the restoration of BHR information in the case where although a branch instruction is predicted to be "taken", it is actually "not-taken" is described.

If a branch instruction is actually "not-taken" although it is predicted to be "taken", a re-fetch starting position differs between when carry occurs and when no carry occurs.

In the information processing device of this preferred embodiment, instruction codes are fetched in units of a specific number. If a branch instruction to predict is the last instruction of this fetch order (if a target branch instruction is a delay branch instruction, it is an instruction shifted forward by the delay), carry occurs and the re-fetch starting position is shifted. Therefore, the restoration of BHR information must also be divided into when carry occurs and when no carry occurs.

Figure 6A:
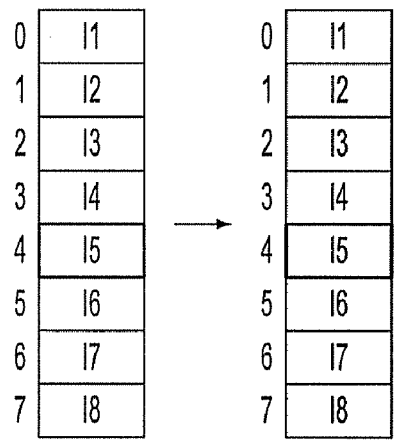
FIG. 6A shows slots and their carry in the case where no carry occurs and FIG. 6B shows slots and their carry in the case where carry occurs.
Figure 6B:
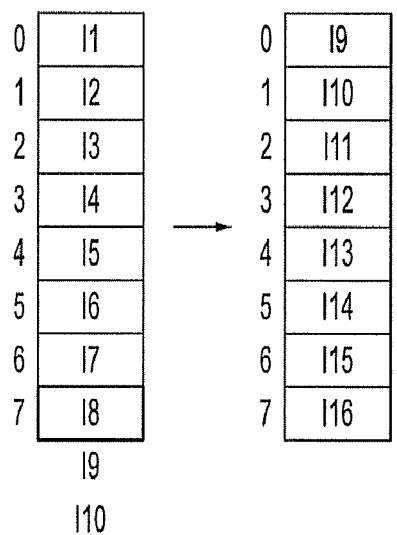

FIG. 6 shows slots and carry. The information processing device in this preferred embodiment simultaneously fetches instructions codes in units of slots. In FIG. 6, 1 slot=8. FIG. 6A shows the case where no carry occurs and FIG. 6B shows the case where carry occurs.

In FIG. 6A, the instruction I5 is actually "not-taken" although it is predicted to be "taken". In this case, no carry occurs, and the instructions I1 through I8 are re-fetched.

In FIG. 6B, the instruction I8 is actually "not-taken" although it is predicted to be "taken". In this case, carry occurs, and the instructions I9 through I16 following the instruction I8 are re-fetched. In the case of a delay branch instruction, if an instruction located forward for the delay is actually "not-taken" although it is predicted to be "taken", carry occurs. In FIG. 6B, if the instruction I7 or I6 is actually "not-taken" although it is predicted to be "taken", carry occurs.

Figure 7:
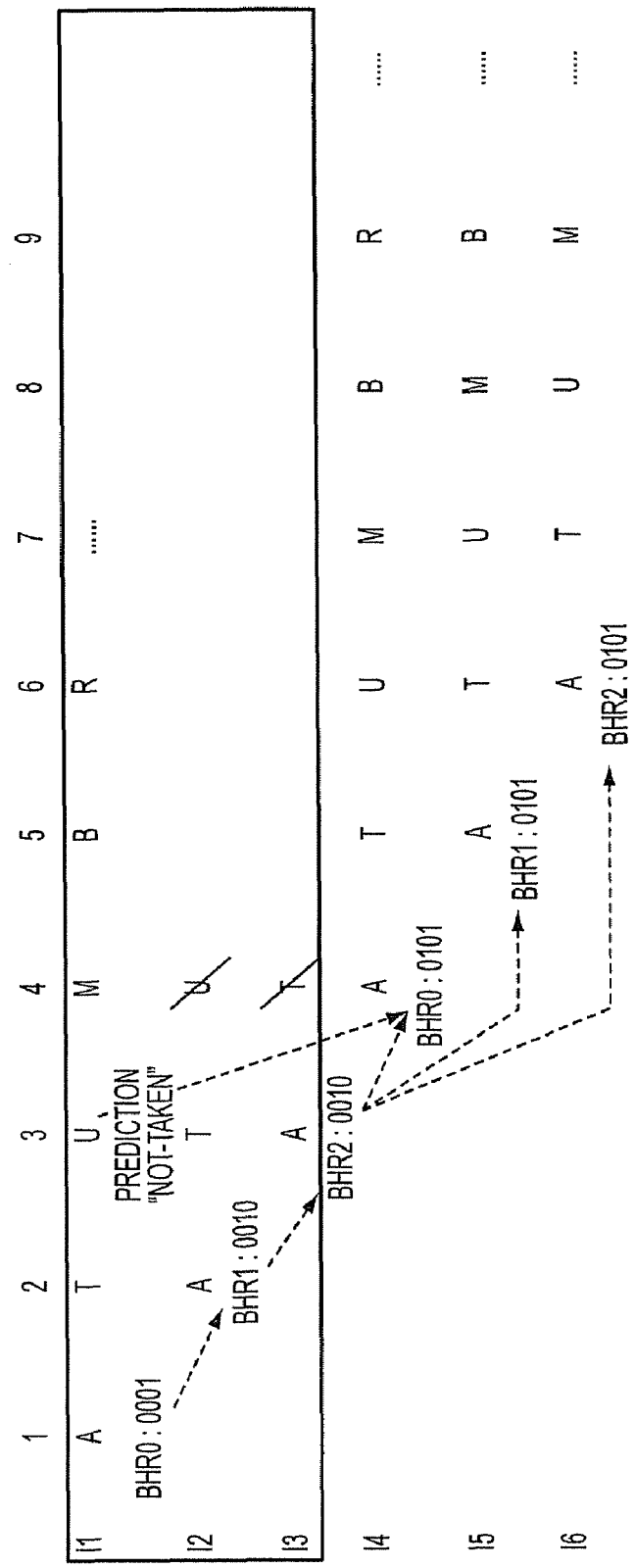
FIG. 7 shows an example of the change of BHR information in the case where a branch instruction is actually "not-taken" although it is predicted to be "taken" and where no carry occurs.

FIG. 7 shows an example of the change of BHR information in the case where a branch instruction is actually "not-taken" although it is predicted to be "taken" and where no carry occurs.

In FIG. 7, the instruction I1 is actually "not-taken", although it is predicted to be "taken".

When the branch conditions of the instruction I1 are determined and it is detected that branch prediction fails and the instruction I1 is actually "not-taken", based on the state of the condition code register, the branch instruction-dedicated reservation station 18 notifies the instruction fetch control unit 16 and BHR reconstruction unit 19 of the branch prediction failure and makes them re-fetch from the instruction I1.

If no carry occurs, as indicated by meshing in FIG. 7, the BHR information used in the instruction I1 is restored in the first place. Therefore, when the branch instruction-dedicated reservation station 18 determines that branch prediction fails, the BHR reconstruction unit 19 restores the BHR information BHR1: 0010 used in the instruction I2 by applying difference information P_REIFCH_BHR_RESTORE1='01' to the BHR information BHR0: 0001 used in the instruction I1 in the branch history information, and restores the BHR information BHR1: 0010 used in the instruction I3 by applying difference information P_REIFCH_BHR_RESTORE2='00' to this. Then, re-fetch is conducted from the position of the instruction I1. Since the instruction I1 is predicted to be "taken", BHR information 0101 is obtained by applying 1-shift to the BHR information BHR1: 0010 used in the instruction I3, and is used in the instructions I4, I5 and I6 as BHR information BHR0, BHR1 and BHR2.

Figure 8:
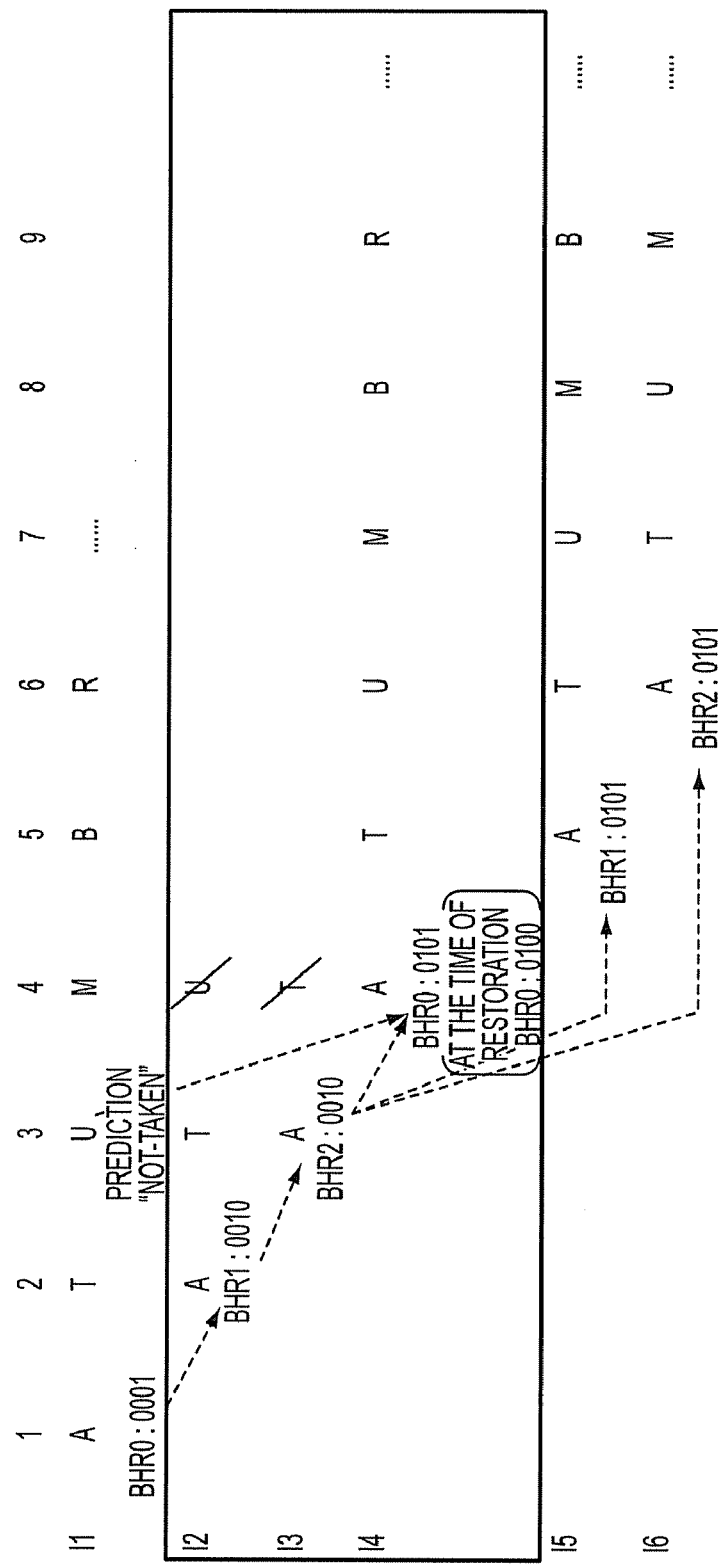
FIG. 8 shows an example of the change of BHR information in the case where a branch instruction is actually "not-taken" although it is predicted to be "taken" and where carry occurs.

FIG. 8 shows an example of the change of BHR information in the case where a branch instruction is actually "not-taken" although it is predicted to be "taken" and where carry occurs.

When the branch conditions of the instruction I1 are determined and it is detected that branch prediction fails and the instruction I1 is actually "not-taken", based on the state of the condition code register, the branch instruction-dedicated reservation station 18 notifies the instruction fetch control unit 16 and BHR reconstruction unit 19 of the branch prediction failure and makes them to re-fetch from the instruction I1.

If carry occurs, BHR information used in the instructions I2, I3 and I4 which are indicated by meshing in FIG. 8 is restored. When the branch instruction-dedicated reservation station 18 receives a prediction failure notice, the BHR reconstruction unit 19 restores the BHR information BHR1: 0010 used in the instruction I2, using the BHR information BHR0: 0001 used in the instruction I1 in the branch history information and difference information P_REIFCH_BHR_RESTORE1='10', and restores the BHR information BHR1: 0010 used in the instruction I3 by applying difference information P_REIFCH_BHR_RESTORE2='00'.

Then, BHR information 0101 is obtained by applying 1-shift to the BHR1: 0010 used in the instruction I3 since the instruction I3 is predicted to be "taken", and is used in the instructions I4, I5 and I6 as BHR information. However, since the instruction I1 is "not-taken", the BHR information of the instruction I4 becomes BHR0: 0100 when difference information P_REIFCH_BHR_RESTORE1='01' (fixed value) is applied to the BHR information BHR1: 0010.

Figure 9:
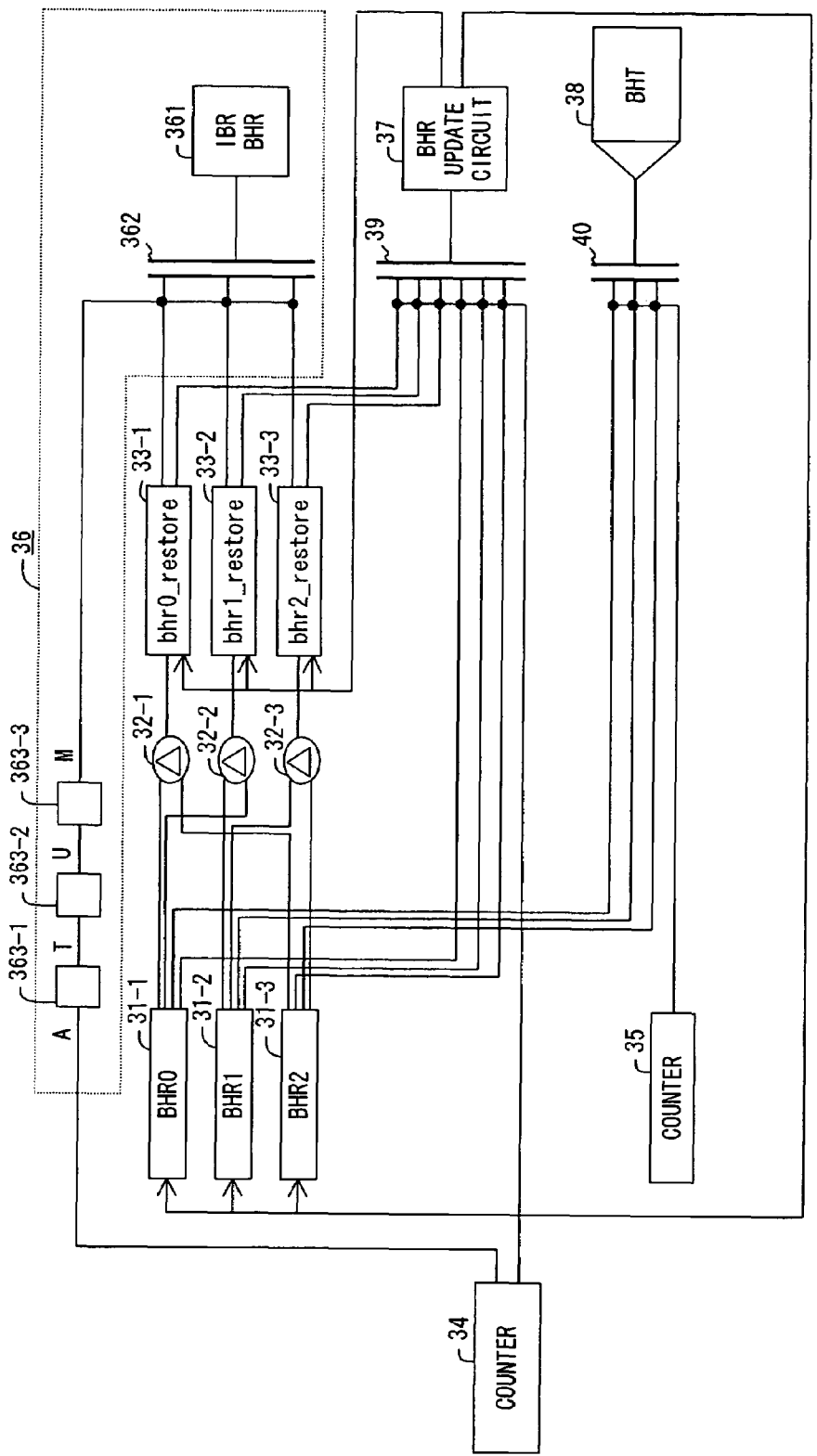
FIG. 9 is a block diagram showing he configuration of a BHR and its surrounding part.

FIG. 9 is a block diagram showing the configuration of a BHR and its surrounding part.

FIG. 9 shows the related part of the BHR 11 and branch prediction control unit 15, and the instruction fetch control unit 16. BHR information storage registers 31-1~31-3, operators 32-1~32-3 and difference information storage registers 33-1~33-3 in FIG. 9 correspond to the BHR 11 shown in FIG. 2. An instruction fetch control unit 36 corresponds to the part related to the BHR of the instruction fetch control unit 16. The other part corresponds to the part related to the BHR of the branch prediction control unit 15. A BHT 38 corresponds to the BHT 12.

In FIG. 9, the BHR information storage registers 31-1~31-3 store three segments of BHR information, BHR0, BHR1 and BHR2, respectively. The difference information storage registers 33-1~33-3 are two-bit registers for storing the above-mentioned difference information BHR0_RESTORE, BHR1_RESTORE and BHR2_RESTORE, respectively, and these values can be calculated by the operator 32, using the value of BHR information in the BHR information storage register 31. The BHR information BHR0, BHR1 and BHR2 in the BHR information storage registers 31-1~31-3 is used in order of BHR0, BHR1, BHR2, BHR0 and so on.

A counter 34 indicates which is the latest value, BHR0, BHR1 or BHR2, that is, in which BHR information storage register the latest BHR information is stored, 31-1, 31-2 or 31-3, and changes like BHR0→BHR1→BHR2→BHR0 every time the BHR information is updated. A counter 35 indicates using which BHR information fetch is conducted, BHR0, BHR1 or BHR2, and changes like BHR0→BHR1→BHR2→BHR0 every fetch.

A BHR update circuit 37 generates updated BHR information from the latest BHR information when BHR information is updated, and transmits it to a corresponding BHR information storage register 31. A selector 39 selects one that stores the latest BHR information indicated by the counter 34 from the BHR information storage registers 31-1~31-3, and outputs the stored contents to the BHR update circuit 37.

A selector 40 selects one that stores BHR information to be used for fetch indicated by the counter 35 from the BHR information storage registers 31-1~31-3. The BHT 38 is referenced by using this BHR information.

The IBR BHR 361 in the instruction fetch control unit 36 is a buffer for storing ibr_bhr information transmitted from the instruction fetch control unit 36 to the branch instruction-dedicated reservation station 18 through the instruction decoding unit 17, and stores BHR information used for reference to BHT 38 and its difference information with other BHR information.

The ibr_bhr information is composed of P_REFIDCH_BHR indicating BHR information used to reference to the BHT 12 when fetching a branch instruction and difference information P_REIFCH_BHR_RESTORE1, P_REIFCH_BHR_RESTORE2 and P_REIFCH_BHR_RESTORE3 between the BHR information and two other segments of BHR information. As to the relationship between P_REFIDCH_BHR and the difference information, P_REIFCH_BHR_RESTORE1 indicates the difference between P_REFIDCH_BHR and subsequent BHR information, and P_REIFCH_BHR_RESTORE1 indicates the difference information between the subsequent BHR information and subsequent BHR information after the subsequent BHR information. For example, if P_REFIDCH_BHR is for BHR1, BHR2_RESTORE indicating the difference information between BHR1 and BHR2 becomes P_REIFCH_BHR_RESTORE1, and BHR0_RESTORE indicating the difference between BHR2 and BHR0 becomes P_REIFCH_BHR_RESTORE2. P_REIFCH_BHR_RESTORE3 is used only when carry occurs, and is a fixed value ('01').

Buffers 363-1~363-3 buffer the value of the counter 34. A counter value indicating a BHR information storage register 31 that stores BHR information used for reference to the BHT 38 at stage A is stored by the buffers 363-1~363-3 up to stages, T, U and M, and at stage M, it instructs a selector 362 to select BHR0~BHR2 in the BHR information storage register 31 and its difference information.

An instruction is fetched. When the instruction reaches stage M, the BHR information used for reference to the BHT 38 is selected by the selector 362 together with the difference information and is stored in the IBR BHR 361. ibr_bhr information in the IBR BHR 361 is transmitted to the branch instruction-dedicated reservation station 18 through the instruction decoding unit 17. When the branch instruction-dedicated reservation station 18 determines that branch prediction fails, branch history information including the ibr_bhr information is transmitted to the BHR reconstruction unit 19 together with a branch prediction failure notice. The BHR reconstruction unit 19 restores the branch history information.

Figure 10:
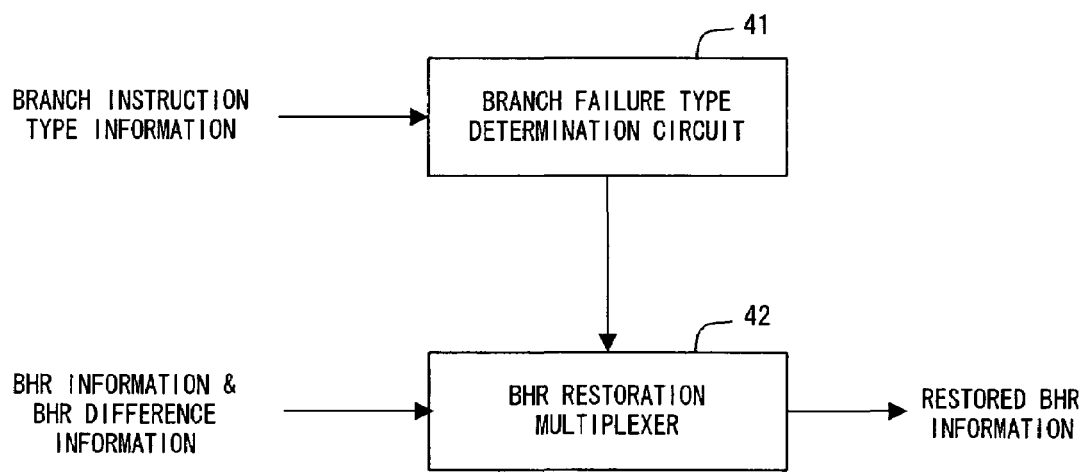
FIG. 10 shows the basic configuration of the BHR reconstruction unit.

FIG. 10 shows the basic configuration of the BHR reconstruction unit 19.

The BHR reconstruction unit 19 comprises a branch failure type determination circuit 41 and a BHR restoration multiplexer 42.

The branch failure type determination circuit 41 determines the type of branch failure, based on branch instruction type information indicating the type of a branch instruction (conditional branch/non-conditional branch instruction, etc.) and type of prediction failure (prediction failure of branch direction/failure of branch address, etc.) that are transmitted together with the branch history information and notifies the BHR restoration multiplexer 42 of the type of branch failure. The BHR restoration multiplexer 42 restores the BHR information using the BHR information and difference information in the branch history information according to the type notified by the branch failure type determination circuit 41.

Figure 11:
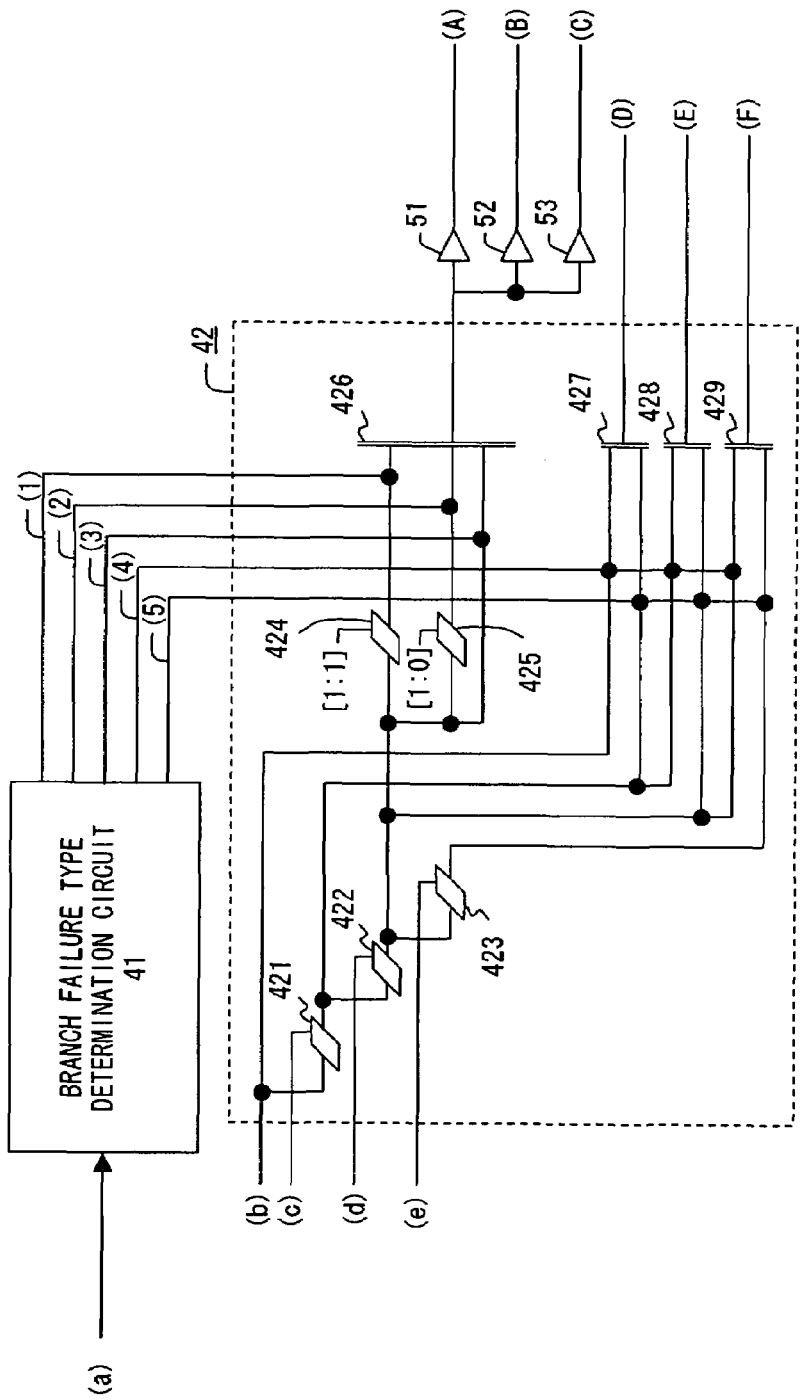
FIG. 11 shows the detailed configuration of the BHR reconstruction unit.

FIG. 11 shows the detailed configuration of the BHR reconstruction unit 19.

Branch instruction type information (b) inputted to the branch failure type determination circuit 41 includes p_tiar_match, p_pred_taken, p_taken, p_always, p_has_no_taken and p_iar_carry.

P_tiar_match is information indicating whether a target address, which is a branch destination, is as predicted. P_pred_taken is information indicating whether a branch instruction is predicted to be "taken". P_taken is information indicating that the branch instruction is actually "taken". P_always is information indicating whether the branch instruction is non-conditional branch instruction. P_has_not_taken is information indicating whether a branch instruction has one "not-taken" before it in the same slot. p_iar_carry is one-bit information indicating whether carry occurs when re-fetching.

The branch failure type determination circuit 41 selects and determines one type of branch failure from the following five types, based on the above-mentioned information.

(1) A conditional branch instruction that is actually "not-taken" although it is predicted to be "taken".

(2) A non-conditional branch instruction with a previous instruction predicted to be "not-taken" in the same slot.

(3) A non-conditional branch instruction with no previous instruction predicted to be "not-taken" in the same slot.

(4) A conditional branch instruction that is actually "taken" although it is predicted to be "not-taken" and in which carry occurs.

(5) A conditional branch instruction that is actually "taken" although it is predicted to be "not-taken" and in which no carry occurs.

The above-mentioned type determination is made by the following logical expressions. In the following expressions, '&', '|' and '~' mean AND, OR and negative, respectively. p_taken_miss represents (~p_tiar_match&p_pred_taken&p_taken)|(~p_pred_taken&p_taken), and p_taken_miss represents p_pred_taken&~p_taken.

(1) p_taken_miss&~p_always
(2) p_taken_miss&p_always&p_has_not_taken
(3) p_taken_miss&p_always&~p_has_not_taken
(4) p_taken_miss&~p_iar_carry
(5) p_taken_miss&p_iar_carry The BHR restoration multiplexer 42 restores BHR information, using ten-bit P_REFIDCH_BHR indicating BHR information used for the branch prediction of the instruction, two-bit difference information P_REIFCH_BHR_RESTORE1, P_REIFCH_BHR_RESTORE2 and P_REIFCH_BHR_RESTORE3, based on the type determination result from the branch failure type determination circuit 41.

If the branch failure type determination circuit 41 notifies the BHR restoration multiplexer 42 that the branch failure type is (1), the BHR restoration multiplexer 42 shifts P_REFIDCH_BHR (b) using a shifter 421, based on P_REIFCH_BHR_RESTORE1 (c) and selects a value obtained by applying 1-shift to a value shifted using a shifter 424 that is obtained by shifting it using a shifter 422, based on P_RE-IFCH_BHR_RESTORE2 (d), using a selector 426.

Then, the BHR restoration multiplexer 42 outputs restored BHR information P_REFIDCH_BHR0 (A), P_REFIDCH_BHR1 (B) and P_REFIDCH_BHR2 (C) through the buffers 51, 52 and 53, respectively. If the branch failure type determination circuit 41 notifies the BHR restoration multiplexer 42 that the branch failure type is (2), the BHR restoration multiplexer 42 selects a value obtained by applying 0-shift to the output of the shifter 422, using a shifter 425, using the selector 426, and outputs restored BHR information P_REFIDCH_BHR0 (A), P_REFIDCH_BHR1 (B) and P_REFIDCH_BHR2 (C) through the buffers 51, 52 and 53, respectively. If the branch failure type determination circuit 41 notifies the BHR restoration multiplexer 42 that the branch failure type is (3), the BHR restoration multiplexer 42 selects the output of the shifter 422, using the selector 426 and outputs restored BHR information P_REFIDCH_BHR0 (A) P_REFIDCH_BHR1 (B) and P_REFIDCH_BHR2 (C).

If the branch failure type determination circuit 41 notifies the BHR restoration multiplexer 42 that the branch failure type is (4), the BHR restoration multiplexer 42 selects P_REFIDCH_BHR (b), using a selector 427 and outputs it as restored BHR information (BHR0) P_REFIDCH_BHR0 (d). The BHR restoration multiplexer 42 also selects the output of the shifter 421, using a selector 428 and outputs it as restored BHR information (BHR1) P_REFIDCH_BHR0 (e). The BHR restoration multiplexer 42 also selects the output of the shifter 422, using a selector 429 and outputs it as restored BHR information (BHR2) P_REFIDCH_BHR2 (f). If the branch failure type determination circuit 41 notifies the BHR restoration multiplexer 42 that the branch failure type is (5), the BHR restoration multiplexer 42 selects the output of the shifter 421, using a selector 427 and outputs it as restored BHR information P_REFIDCH_BHR0 (d). The BHR restoration multiplexer 42 also selects the output of the shifter 422, using a selector 428 and outputs it as restored BHR information P_REFIDCH_BHR0 (e). The BHR restoration multiplexer 42 also selects the output of the shifter 423, using a selector 429 and outputs it as restored BHR information P_REFIDCH_BHR2 (f).

Next, how to restore BHR information when re-fetching due to a branch failure is described.

When re-fetching, the BHR reconstruction unit 19 restores BHR0, BHR1 and BHR2, using branch history information. How to restore BHR information when re-fetching due to a branch failure is described by dividing it into when a branch instruction is actually "taken" although it is predicted to be "not-taken" and when a branch instruction is actually "not-taken" although it is predicted to be "taken".

(1) In case a branch instruction is actually "taken" although it is predicted to be "not-taken" and in case a branch destination address is wrong although a branch instruction is predicted to be "taken" and is actually "taken".

In this case, re-fetch is started from the branch destination of a failed branch instruction.

(1-1) In Case the Failed Branch Instruction is a Conditional One (Corresponding to Type (1) Shown in FIG. 11)

Difference information P_REIFCH_BHR_RESTORE1 [1:0] and P_REIFCH_BHR_RESTORE2 [1:0] are applied to the BHR information P_REFIDCH_BHR [9:0] used to refer to a BHT in that order. Furthermore, BHR generated by applying 1-shift to their results are used as BHR0, BHR1 and BHR2. '00' is also written into difference information BHR0_RESTORE, BHR1_RESTORE and BHR2_RESTORE.

(1-2) In Case the Failed Branch Instruction is a Non-Conditional One (Corresponding to Type (2) Shown in FIG. 11)

P_REIFCH_BHR_RESTORE1 [1:0], P_REIFCH_BHR_RESTORE2 [1:0] are applied to P_REFIDCH_BHR [9:0] in that order. Hen, if p_has_not_taken is true (in case a branch instruction has one "not-taken" before it in the slot), BHR generated without any process after applying 0-shift to their results are used as BHR0, BHR1 and BHR2. If p_has_not_taken is not true, BHR generated without any process are used as BHR0, BHR1 and BHR2. '00' is written into difference information BHR0_RESTORE, BHR1_RESTORE and BHR2_RESTORE.

(2) In Case a Branch Instruction is Actually is "Not-Taken" Although it is Predicted to be "Taken"

In this case re-fetch is started from an instruction following a failed branch instruction.

(2-1) In Case the Failed Branch Instruction is not the Last One in a Fetch Unit and No Carry Occurs (Corresponding to Type (4) Shown in FIG. 11)

P_REIFCH_BHR [9:0] is written into a BHRX (BHR (BHR0/1/2) used by the branch instruction), a value obtained by applying P_REIFCH_BHR_RESTORE1 [1:0] to P_REIFCH_BHR [9:0] is written into a BHR (X+1) (in case X=2, X+1=0) and a value obtained by applying P_REIFCH_BHR_RESTORE2 [1:0] to the BHR (X+1) is written into a BHR (X+2) (in case X=1, X+2=0; in case X=2, X+2=1). '00' is also written into difference information BHR0_RESTORE, BHR1_RESTORE and BHR2_RESTORE.

(2-2) In Case the Failed Branch Instruction is the Last One in a Fetch Unit and Carry Occurs (Corresponding to Type (5) Shown in FIG. 11)

A value obtained by applying P_REIFCH_BHR_RESTORE1 [1:0] to P_REIFCH_BHR [9:0] is written into a BHRX (BHR (BHR0/1/2) used by the branch instruction), a value obtained by P_REIFCH_BHR_RESWTORE2 [1:0] to P_REIFCH_BHR [9:0] is written into a BHR (X+1) (in case X=2, X+1=0), and a value obtained by applying P_REIFCH_BHR_RESTORE3 [1:0] to the BHR (X+1) is written into BHR2. '00' is also written into difference information BHR0_RESTORE, BHR1_RESTORE and BHR2_RESTORE.

Figure 12:
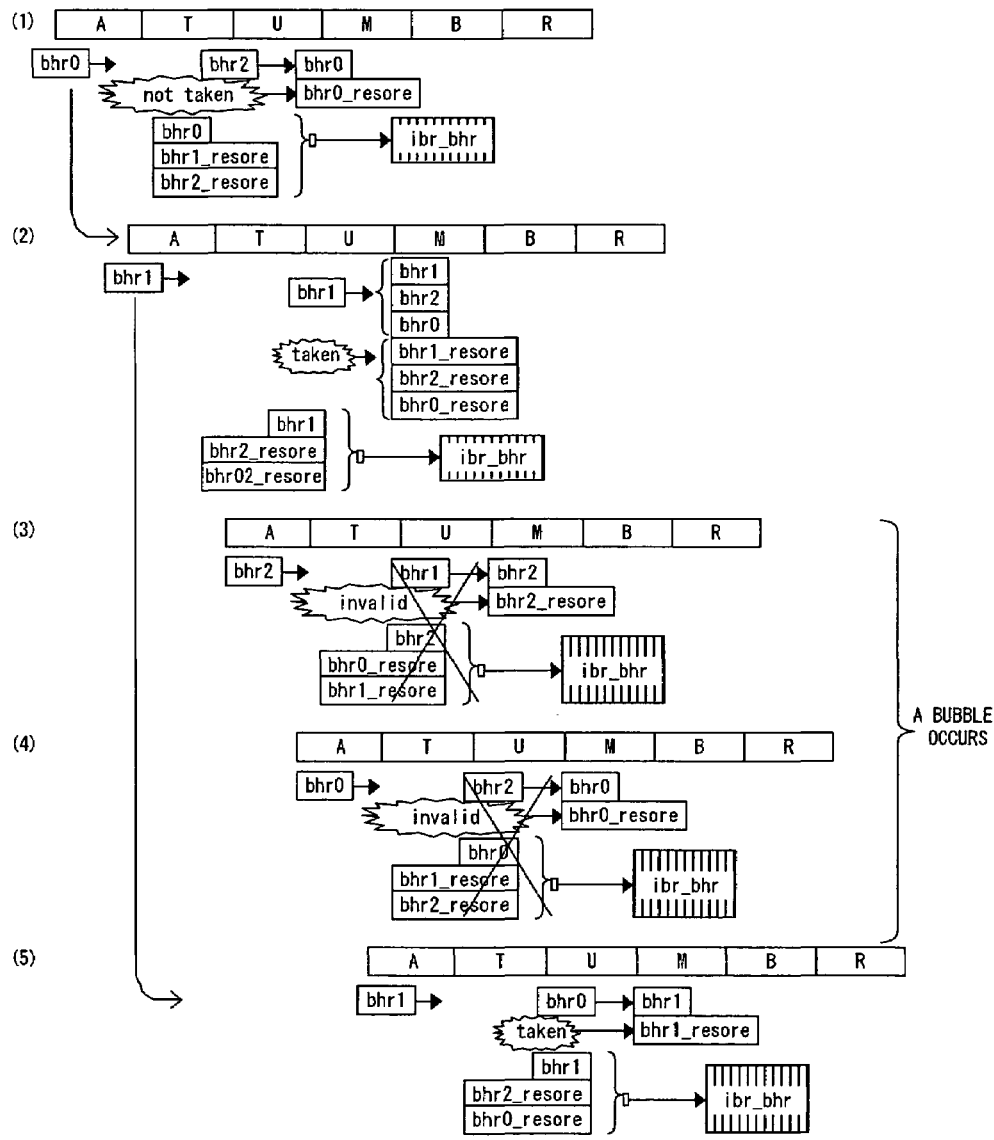
FIG. 12 shows an example of the update operation of BHR information in the information processing device of the preferred embodiment in the case where branch prediction succeeds.
Figure 13:
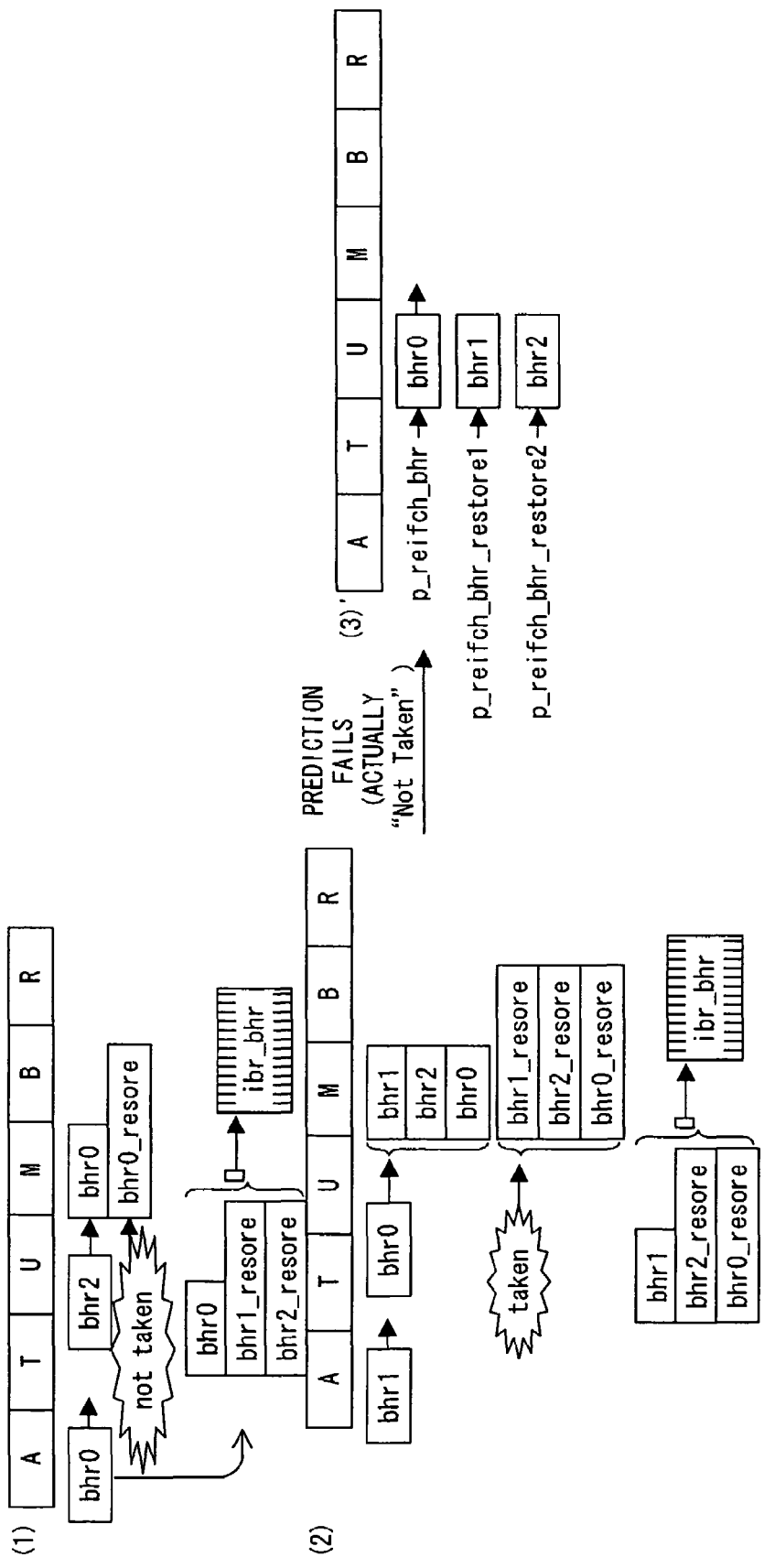
FIG. 13 shows an example of the update operation of BHR information in the information processing device of the preferred embodiment in the case where branch prediction fails.

FIGS. 12 and 13 show examples of the update operation of BHR information in the information processing device of the preferred embodiment.

FIG. 12 shows an example in the case where branch prediction succeeds. It is assumed that re-fetch is started in (1), and that a branch instruction is predicted to be "not-taken" at stage U. BHR0 is updated by applying 0-shift to BHR2, which is the latest BHR information, based on this prediction result, and also difference information BHR0_RESTORE is rewritten to '10'. Then, BHR0, which is BHR information used in (1), and difference information BHR1_RESTORE and BHR2_RESTORE are transmitted from the instruction fetch control unit 16 to the instruction decoding unit 17 as ibr_bhr information in the same timing as an instruction code arrives from the primary instruction cache 14.

It is assumed that during this period, an address following (1) is fetched in (2), and that this instruction is predicted to be "taken". If a branch instruction is predicted to be "taken", three segments of BHR information are all rewritten based on BHR1, which is the BHR information used in (2). The BHR1, which is the BHR information used in (2), and difference information BHR2_RESTORE and BHR0_RESTORE are transmitted from the instruction fetch control unit 16 to the instruction decoding unit 17 as ibr_bhr information.

Before the branch instruction is predicted to be "taken" in (2), (3) and (4) are fetched. However, when it is predicted to be "taken", these are discarded, and neither the update of BHR information nor registration of ibr_bhr information is conducted.

Then, a branch destination instruction (5) is fetched based on the result of the branch prediction of (2). In this fetch of (5), BHR obtained by applying 1-shift to the BHR2 used in (2) is used.

FIG. 13 shows an example of the update operation of BHR information in the case where branch prediction fails.

In FIG. 13, in (1) and (2), the same process as shown in FIG. 12 is performed before the result of the branch prediction is detected. When it is detected that the "taken" prediction of (2) fails, from the state of the condition code register, re-fetch is conducted from an actual branch destination (3)'.

In this case, BHR information restores BHR0 based on P_REIFCH_BHR in ibr_bhr information transmitted to the instruction decoding unit 17 in (2), restores BHR1 by applying P_REIFCH_BHR_RESTORE1 (BHR1_RESTORE) to this and restores BHR2 by further applying P_REIFCH_B-HR_RESTORE2 (BHR0_RESTORE) to this. If carry occurs, BHR information restores BHR0 by applying P_REIFCH_B-HR_RESTORE1 (BHR1_RESTORE) to P_REIFCH_BHR, restores BHR1 by applying P_REIFCH_BHR_RESTORE2 (BHR0_RESTORE) to this and restores BHR2 by further applying P_REIFCH_BHR_RESTORE3 (fixed value) to this.

As described above, in the information of this preferred embodiment, even if branch prediction fails, BHR information can be accurately restored. Accordingly, highly accurate branch prediction can be realized. The restoration of BHR information can be realized without using a complex circuit configuration and control.

Figure 1:
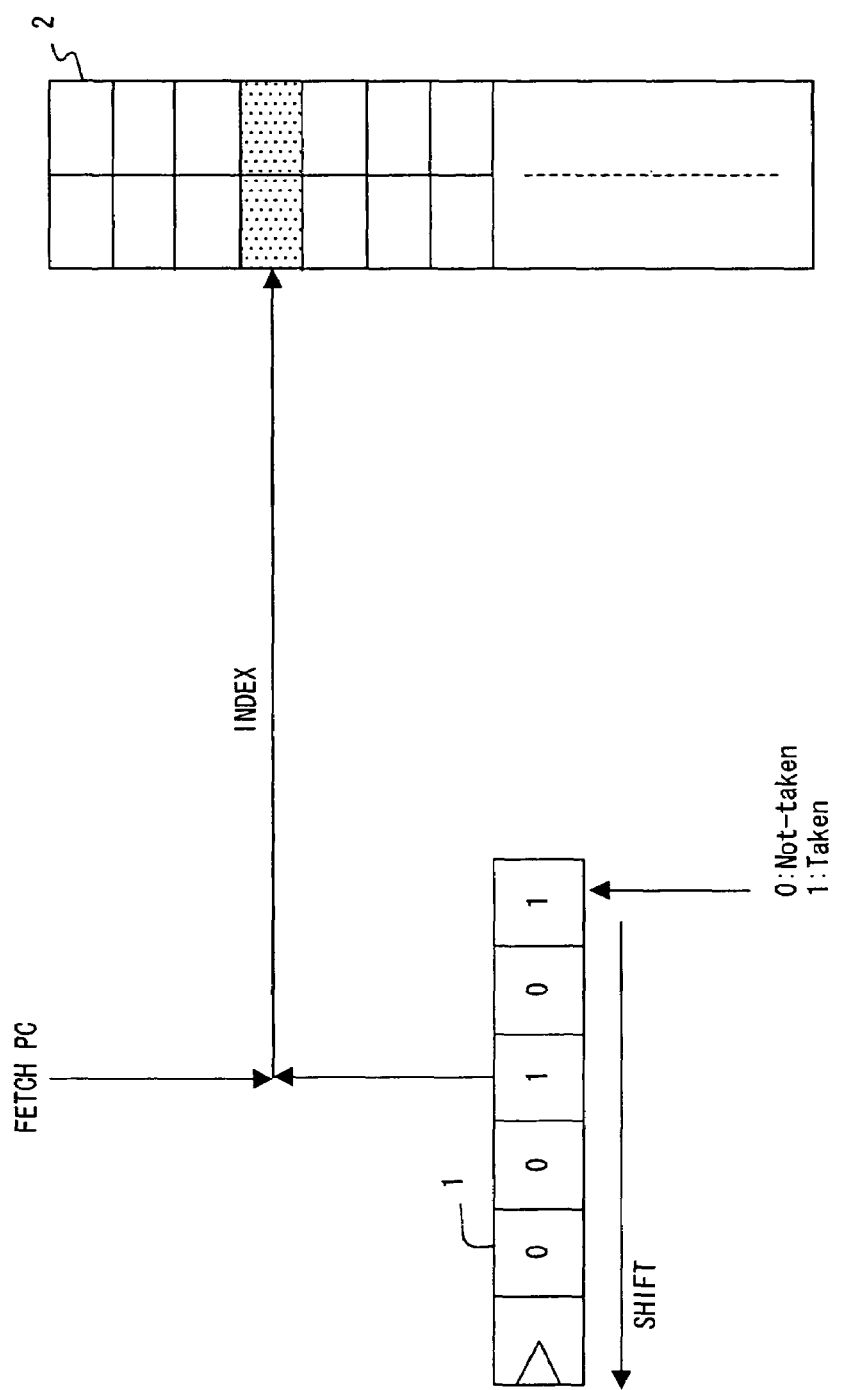
FIG. 1 explains branch prediction by a method using a BHT.

In the information processing device of this preferred embodiment, as shown in FIG. 1, BHR information conducts branch prediction within the information processing device using the branch history of this branch prediction. However, the present invention can be applied to only such BHR information, and it can also be applied to any BHR information in another form, for example, in which embedded prediction contents can be counted in a method for conducting branch prediction when compiling and embedding its result in an instruction code.

According to the present invention, since even an information processing device with a deep pipeline structure accompanying a high clock which requires several cycles for branch prediction control can perform accurate branch prediction control, prediction accuracy can be improved.

Accurate branch prediction control can be realized while maintaining easy control and a simple configuration.

What is claimed is:

1. An information processing device which requires a plurality of cycles for completing branch prediction control, comprising:
   a branch history register (BHR) that stores BHR information indicating branch history of a plurality of branch instructions executed close at hand;
   a branch history information storage unit for storing branch history information, of fetched instructions, the branch history information includes first BHR information used for branch prediction of fetched first instruction, and difference information comprising a difference between the first BHR information and second BHR information used for branch prediction of fetched second instruction that follows the first instruction; and
   a Branch History Register (BHR) re-construction unit for restoring BHR information into the branch history register from the branch history information storage unit used for branch prediction based on the first BHR information and the difference information included in the branch history information stored in the branch history information storage unit when the branch prediction of the branch instruction fails,
   wherein the branch history information storage unit stores a plurality of branch history information based on BHR information for the plurality of cycles that are required to complete the branch prediction control.

2. The information processing device according to claim 1, wherein the branch prediction control requires three cycles, and the branch history information includes the first BHR information used for the branch prediction of the fetched instruction, first difference information indicating a difference between second BHR information and the first BHR information, wherein the second BHR information follows the first BHR information, and wherein third BHR information follows the second BHR information, and
when a conditional branch is actually "taken" although it is predicted to be "not-taken" or when a conditional branch is actually "taken" and "target address miss" although it is predicated to be "taken", said BHR reconstruction unit calculates BHR information by applying the first and second difference information to the first BHR information and applying a 1 bit shift in the branch history information and uses the BHR information as stored first BHR information, second BHR information and third BHR information after restoration.

3. The information processing device according to claim 1, wherein the branch prediction control requires three cycles, and the branch history information includes the first BHR information used for the branch prediction of the fetched instruction, first difference information indicating a difference between second BHR information and the first BHR information where the second BHR information follows the first BHR information and second difference information indicating a difference between third BHR information and the second BHR information where the third BHR information follows the second BHR information, and
when a non-conditional branch instruction has an instruction predicted to be "not-taken" before the instruction in the same slot, said BHR reconstruction unit applies the first and second difference information to the first BHR information in the branch history information and further uses BHR information obtained by applying a zero bit shift to the result as the stored first, second and third BHR information after restoration.

4. The information processing device according to claim 1, wherein the branch prediction control requires three cycles, and the branch history information includes the first BHR information used for the branch prediction of the fetched instructions, first difference information indicating a difference between second BHR information and the first BHR information where the second BHR information follows the first BHR information and second difference information indicating a difference between third BHR information and the second BHR information where the third BHR information follows the second BHR information, and
when a non-conditional branch instruction has no instruction predicted to be "not-taken" before the instruction in the same slot, said BHR reconstruction unit applies the first and second difference information to the first BHR information in the branch history information and further uses BHR information obtained by the result as the first, second and third BHR information after restoration.

5. The information processing device according to claim 1, wherein the branch prediction control requires three cycles, and the branch history information includes the first BHR information used for the branch prediction of the fetched instructions, first difference information indicating a difference between second BHR information and the first BHR information where the second BHR information follows the first BHR information and second difference information indicating a difference between third BHR information and the second BHR information where the third BHR information follows the second BHR information, and when a conditional branch instruction is actually "not-taken" although it is predicted to be "taken" and no carry occurs, said BHR reconstruction unit uses first BHR information in the branch history information, BHR information obtained by applying the first difference information to the first BHR information in the branch history information and BHR information obtained by applying the first and second difference information to the first BHR information in the branch history information as stored first, second and third BHR information after restoration, respectively.

6. The information processing device according to claim 1, wherein the branch prediction control requires three cycles, and the branch history information includes the first BHR information used for the branch prediction of the fetched instructions, first difference information indicating a difference between second BHR information and the first BHR information where the second BHR information follows the first BHR information and second difference information indicating a difference between third BHR information and the second BHR information where the third BHR information follows the second BHR information, and when a conditional branch instruction is actually "not-taken" although it is predicted to be "taken" and carry occurs, said BHR reconstruction unit uses BHR information obtained by applying the first difference information to the first BHR information in the branch history information, BHR information obtained by applying the first and second difference information to the first BHR information in the branch history information and BHR information obtained by applying the first and second difference information and third difference information of a fixed value to the first BHR information in the branch history information as stored first second and third BHR information after restoration, respectively.

7. The information processing device according to claim 1, further comprising a BHR information storage unit for storing the BHR information for the plurality of cycles, wherein when updating the BHR information, a plurality of segments of BHR information in the BHR information storage unit is sequentially updated.

8. The information processing device according to claim 7, further comprising a difference information storage unit for storing difference information of the plurality of segments of BHR information in said BHR information storage unit, wherein the difference information is updated together when the BHR information in the BHR information storage unit is updated.

9. The information processing device according to claim 1, wherein said BHR reconstruction unit determines a type of a branch prediction failure, based on the branch history information and restores the BHR information, based on the type.

10. The information processing device according to claim 1, further comprising a table for storing branch prediction information for predicting a fetched branch instruction in correspondence with fetch addresses, wherein said BHR information is used when referring to the table.

11. A Branch History Register (BHR) information restoration method which is used in an information processing device whose branch prediction control requires a plurality of cycles and restores BHR information used for branch prediction when branch prediction fails, comprising:

a branch history register (BHR) that stores BHR information indicating branch history of a plurality of branch instructions executed close at hand;

storing the branch history information corresponding to fetched instructions, the branch history information includes first BHR information used for branch prediction of fetched first instructions, and difference information comprising a difference between the first BHR information and second BHR information used for branch prediction of fetched second instruction that follows the first instructions; and restoring BHR information used for branch prediction based on the first BHR information and the difference information of the branch history information stored when the branch prediction of the branch instruction fails, wherein the branch history information includes a plurality of branch history information based on BHR information for the plurality of cycles that are required to complete the branch prediction control.

12. An information processing device which requires a plurality of cycles for branch prediction control, comprising:

a branch history register (BHR) that stores BHR information indicating branch history of a plurality of branch instructions executed close at hand;

branch history information means for storing branch history information of fetched instructions, the branch history information includes first BHR information used for branch prediction of fetched first instruction, and difference information comprising a difference between the first BHR information and second BHR information used for branch prediction of fetched second instruction that follows the first instruction; and Branch History Register (BHR) re-construction means for restoring BHR information used for branch prediction based on the first BHR information and the difference information included in the branch history information stored in the branch history information storage means when the branch prediction of the branch instruction fails, wherein the branch history information means stores a plurality of branch history information based on BHR information for the plurality of cycles that are required to complete the branch prediction control.

13. An information processing device which requires a plurality of cycles for completing branch control, the information processing device comprising:

a branch history register (BHR) that stores BHR information indicating results of branch prediction of a plurality of branch instructions executed close at hand at a particular cycle;

a branch instructions reservation station that stores a plurality of branch history information, each branch history information includes first BHR information of a first cycle, and difference information indicating a difference between the first BHR information and second BHR information of a second cycle that follows the first cycle; and a branch history register re-construction unit that restores BHR information stored in the branch history register, wherein the branch instruction reservation station sends branch history information corresponding to branch instruction in which a branch prediction has failed to the branch history register, when the branch prediction has failed, and the branch history register re-construction unit restores BHR information stored in the branch history register based on the branch history information sent from the branch instruction reservation station, and wherein the number of branch history information stored in the branch instruction reservation station corresponds to the number of cycles that is required to complete a branch prediction of one branch instruction.

14. The information processing device according to claim 13, wherein the BHR information having a plurality of bits, each bit indicates a result of branch prediction of a particular branch instruction.

15. The information processing device according to claim 13, wherein the BHR information is updated when a branch prediction of a new branch instruction is performed.

16. The information processing device according to claim 13, further comprising:

a branch prediction unit that performs branch predication of fetched instructions based on BHR information stored in the branch history register, and sends BHR information used for the branch prediction to the branch instruction reservation station, and wherein the branch instruction reservation station stores the BHR information sent from the branch prediction unit.

17. The information processing device according to claim 13, wherein the branch history register re-construction unit restores the second BHR information based on both of the first BHR information and the difference information included in the branch history information sent from the branch instruction reservation station.

* * * * *